P. H. THOMAS.
MEANS FOR KEEPING VAPOR CONVERTERS ALIVE.
APPLICATION FILED DEC. 24, 1903.
1,110,584.
Patented Sept. 15, 1914.
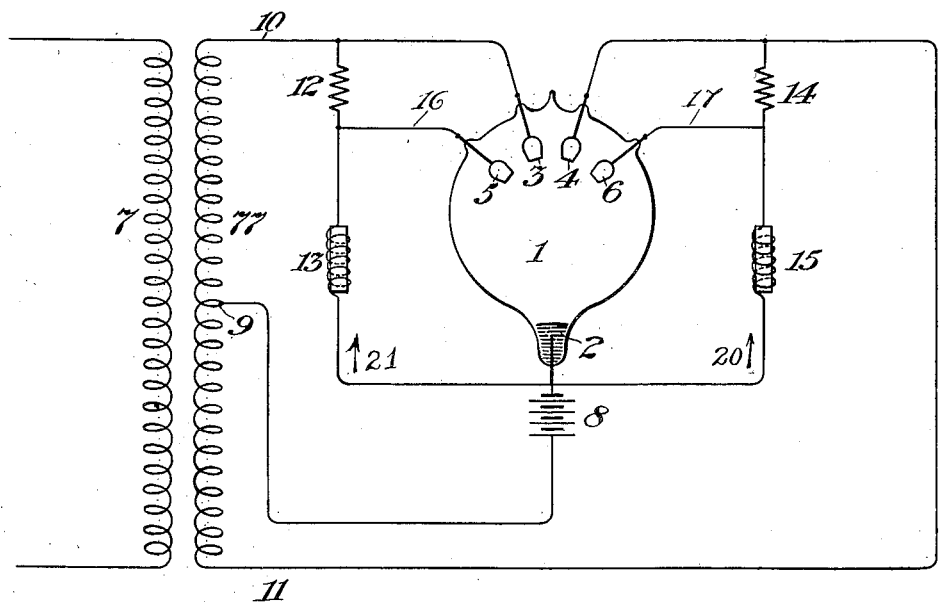

UNITED STATES PATENT OFFICE.

PERCY H. THOMAS, OF EAST ORANGE, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

MEANS FOR KEEPING VAPOR-CONVERTERS ALIVE.

1,110,584. Specification of Letters Patent. Patented Sept. 15, 1914.

Application filed December 24, 1903. Serial No. 186,489.

*To all whom it may concern:*

Be it known that I, PERCY H. THOMAS, a citizen of the United States, and resident of East Orange, county of Essex, State of New Jersey, have invented certain new and useful Improvements in Means for Keeping Vapor-Converters Alive, of which the following is a specification.

In operating direct current work circuits through vapor converters from alternating current sources, where it is necessary to keep the converter alive, it has been customary at times to provide an inductive shunt and to rely upon the discharge from the inductive device for bridging over the zero point of the alternating current to the work circuit. This method becomes inefficient, however, in case the load contains a source of counter electro-motive-force, as this counter electro-motive-force may interfere with the passage of the inductive device current through the appropriate path for keeping the converter alive. The herein described invention is a system by which the keeping alive function is accomplished in such a manner as to eliminate this and other disadvantages and to have certain peculiar characteristics of its own.

The invention will be understood from the description given in connection with the drawings.

My invention is illustrated in the accompanying drawing which is a diagram of a system of circuits adapted to contribute to the carrying out of my invention, the vapor converter being shown in section.

In the drawing, 1 is a vapor converter having a negative electrode, 2, of mercury or other suitable conducting fluid, two main positive electrodes, 3 and 4, and two supplemental positive electrodes, 5 and 6. The two main positive electrodes 3 and 4 are connected to the terminals of an alternating current source and the negative electrode is connected through a suitable load, such as a storage battery, 8, with the neutral or other intermediate point, 9, of the said source. This source may be a transformer, the primary, 7, of which is connected to any suitable alternating current generator, and the secondary, 77, of which is a direct current source of supply for the circuits herein described. Between the leads, 10 and 11, (running respectively from the opposite terminals of the source to the main positive electrodes, 3 and 4) and the lead from the negative electrode 2, are interposed, on the one hand, a resistance, 12, and an inductance, 13, and on the other hand, a resistance, 14, and an inductance, 15. From a point between the resistance 12 and the inductance 13, a conductor 16 is led off and connected with the supplementary positive electrode 5; and similarly from a point between the resistance 14 and inductance 15, a conductor, 17, is led off and connected with the supplemental positive electrode 6. The operation of this arrangement of circuits is as follows: During one alternation or phase of the current, energy is transmitted by way of the positive electrode 3 through the negative electrode 2 and the load 8 back to the supply through the neutral wire to the point 9. During this time the negative electrode 2 and the positive electrode 4 are affected by nearly the full potential of the supply, which will cause an increasing current to flow through the choke coil 15 and resistance 14 in the direction of the arrow 20, the direction of the electro-motive-force produced by the choke coil being the same. As, however, the electro-motive-force of the supply falls there finally comes a zero point in the current delivered through the positive electrode 3 and a tendency of the current through the choke coil 15 and the resistance 14 to diminish. This causes a reversal of the direction of the electro-motive-force generated in the coil 15, which reversal results in the well known tendency of inductances to continue the flow of current in the original direction in the inductance finding its easiest path through the supplemental electrode 6 to the negative electrode 2. If the path be properly proportioned, before the energy of the choke coil 15 is exhausted the positive electrode 4 will have begun to supply current to the negative electrode 2 and the work circuit 8 and the several cycles of operation will be repeated through the choke coil 13, the resistance 12 and the electrodes 5 and 3, the direction of flow through the said choke coil and resistance being indicated by the arrow 21.

In this arrangement of the circuits, the storage battery or other source of counter electro-motive-force can never cause disturbance to the passage of the choke coil currents through their proper paths, by reason of the fact that such coils during their charging periods are acted upon by an electro-motive-force opposed to the counter electro-motive-force of the storage battery or other source, and of nearly twice the magnitude.

That there may be no possible misunderstanding of the operation of the device herein described, the action may be set forth in the few following paragraphs.

In this system the work currents are fed alternately from the two main anodes 3 and 4 through the work circuit 8. These impulses keep the device alive except for the zero points between them. There is required in addition merely impulses bridging these zero periods which impulses are supplied alternately by the supplemental anodes 5 and 6. This impulse from a supplemental anode comes from the choke coil associated therewith and is derived from energy stored in that choke coil during the prior alternation. The discharge of this energy takes place as follows: While a working impulse is passing from the main anode 3 to the work circuit, a small current passes simultaneously by way of the coil 15 and resistance 14 to the line wire 11. It is clear that the potential of the cathode 2 during this period is practically that of the anode 3 except for the drop of voltage in the rectifier itself which is but a few volts. Therefore, the voltage impressed upon the inductance 15 and the resistance 14 is for the time being substantially the full voltage of both halves of the transformer secondary 77. Energy is thus stored at a relatively rapid rate. As the voltage of the supply drops to zero the impulse in the work circuit ceases and the storing of energy in the coil 15 ceases. The energy previously stored, however, now provides a sufficient electro-motive-force to maintain the flow of current in this coil 15 at its previously established value except for the wearing away of energy due to the current flow. The easiest path for this current, which is supported by the coil 15, is through the supplemental anode and the cathode 2. Since, now, energy was stored at a very high rate under the full transformer voltage, it will be worn away at a relatively low rate since the discharge path requires but a few volts to maintain the current. Therefore, the discharge of the coil 15 may continue not only over the first zero point but through the next alternation and the next zero point until charging in this coil is again resumed in the next cycle. It is possible, however, that the stored energy may run out before the recharging period recurs, that is, it may run out while the main anode 4 is supplying work current to the cathode 2. During this period, obviously, the cathode 2 is at approximately the voltage of the main anode 4 except for the few volts lost in the rectifier. That is, the voltage impressed upon the inductance 15 and resistance 14 is but a few volts. These few volts, however, are in the direction opposite to the normal flow of current in the coil 15 and so far as a small voltage may be effective it tends to establish flow backward in the coil 15. Such backward flow of current must be overcome before any energy can be usefully stored in the coil 15 from the side current coming from the main anode 3. Such backward current would be very small in any case. A similar action takes place in connection with the inductance 13 but a half cycle later in time.

It is thus seen that the current in each of the coils 13 and 15 is practically unidirectional always flowing (with the possible momentary reversal) from the coil to the supplemental anode. While it is true that the coils 13 and 15 with the resistance 12 and 14 constitute a shunt on the transformer supply the current flow from these coils is entirely dominated by the varying of the potential of the anode 3 in one alternation to that of the anode 4 in the next alternation, in such a way that during one set of waves practically all the voltage is impressed upon one of the coils and during the other train of waves practically all the voltage is impressed upon the other coil, with the result that there is on the average a strong unidirectional voltage on each of the coils in opposite directions in the two coils. Were no vapor rectifier present there would, of course, be a small symmetrical alternating current flow across the transformer secondary 77 through the coils and the resistances. It may be pointed out that the energy bearing current for the coil 15 comes from the main anode 3 by way of the cathode and that the energy bearing current for the coil 13 comes from the main anode 4 by way of the cathode 2.

I claim as my invention:—

1. In a circuit containing a vapor converter requiring to be kept alive and having a negative electrode, one or more main positive electrodes and one or more supplemental positive electrodes, the method of supplying current through the converter from an alternating current source at the natural zero point in the supply, which consists in accumulating an inductive charge during one alternation in shunt to the converter and discharging the energy at the appropriate time through the supplemental electrode and the negative electrode.

2. In a circuit containing a vapor converter requiring to be kept alive and having a negative electrode, one or more main positive electrodes and one or more supplemental positive electrodes, the method of supplying current through the converter from an alternating current source at the natural zero point in the supply, which consists in causing current to pass through a path including a main positive electrode and the negative electrode during one alternation, accumulating an inductive charge during the same alternation in shunt to the converter, and discharging the energy accumulated in the charge at the appropriate time through a path including a supplemental electrode and the negative electrode.

3. In a system of electrical distribution, comprising a source of alternating current supply, a direct current work circuit, and an interposed vapor converter, the method of keeping the converter alive and maintaining a continuous supply of current in the work circuit, which consists in applying to the converter alternately from opposite terminals of the supply source impulses of like phase representing a fractional part of the electro-motive-force of the supply, and, at times of the natural zero for the said impulses, applying to the converter impulses accumulated substantially from the entire electro-motive-force of the supply.

4. In a system of electrical distribution, comprising a source of alternating current supply, a direct current work circuit including a source of counter-electro-motive-force, and an interposed vapor converter, the method of keeping the converter alive and maintaining a continuous supply of current in the work circuit, which consists in applying to the converter alternately from opposite terminals of the supply source impulses of like phase representing a fractional part of the electro-motive-force of the supply, simultaneously accumulating an inductive charge under the influence of substantially the entire electro-motive-force of the supply, at times of the natural zero for the said impulses, emptying the said charge through the converter.

5. In a system of electrical distribution, comprising a source of alternating current supply, a direct current work circuit including a source of counter-electro-motive-force, and an interposed vapor converter, the method of keeping the converter alive and maintaining a continuous supply of current in the work circuit, which consists in applying to the converter alternately from opposite terminals of the supply source impulses of like phase representing a fractional part of the electro-motive-force of the supply, simultaneously accumulating an inductive charge under the influence of substantially the entire electro-motive-force of the supply and, at times of the natural zero for the said impulses, emptying the said charge through the converter, and simultaneously affecting the discharge current by a resistance preventing its flow through the wrong path.

6. The method of operating a vapor rectifier requiring continuous flow of current therein for purposes of excitation which consists in passing normal work currents through the rectifier and through the receiving circuit, with drawing additional current through the rectifier around the work circuit, storing from this latter current and utilizing this flow of energy to maintain a flow of current in the rectifier during intervals when no current is flowing therethrough to the work circuit.

7. In a system of circuits in which alternating current is rectified by means of the rectifier requiring continuous excitation, the method of securing a free and unimpeded flow of useful current through the rectifier to its receiving circuit which consists in maintaining excitation of the rectifier during times when no current is flowing to the rectified circuit by means of energy obtained from the supply stored momentarily and deriving said energy without permitting it to traverse the receiving circuit.

8. The method of rendering free and unimpeded the flow of current in a receiving circuit of a rectifier requiring excitation which consists in deriving useful currents from a suitable source through the rectifier and obtaining exciting current from the circuit independent of the receiving circuit.

9. The method of operating a rectifier requiring continuous excitation which consists in deriving useful currents and securing exciting current from the supply through the rectifier independently of the useful currents so that an interruption in the useful currents will not cause an interruption of the exciting current.

10. In a system of electrical distribution, a source of alternating current supply, a direct current work circuit, including a source of counter electro-motive-force, and an interposed vapor converter, the said converter being provided with two main positive electrodes, two supplemental positive electrodes, and a common negative electrode, in combination with a connection from the negative electrode to an intermediate point of the supply, leads from the terminals of the supply to the respective main positive electrodes, shunt connections from the said leads to the negative electrode, such shunt connections, each including an inductance, and leads from the said shunt connections to the respective supplemental positive electrodes.

11. In a system of electrical distribution, a source of alternating current supply, a direct current work circuit, including a source of counter electro-motive-force, an interposed vapor converter, the said converter being provided with two main positive electrodes, two supplemental positive electrodes, and a common negative electrode, in combination with a connection from the negative electrode to an intermediate point of the supply, leads from the terminals of the supply to the respective main positive electrodes, shunt connections from the said leads to the negative electrode, such shunt connections each including an inductance and a resistance, and leads from points between the said inductances and resistances to the respective supplemental positive electrodes.

12. In a system of electrical distribution, a source of alternating current supply, a direct current work circuit, an interposed vapor converter, the said converter being provided with two main positive electrodes, two supplemental positive electrodes and a common negative electrode, in combination with a connection from the negative electrode to an intermediate point of the supply, leads from the terminals of the supply to the respective main positive electrodes, shunt connections from the said leads to the negative electrode, such shunt connections, each including an inductance and a resistance, and leads from points between the said inductances and resistances to the respective supplemental positive electrodes, the inductances on each side being located between the point of connection of the shunt to the supplemental positive electrode and a point of connection of the said shunt to the negative electrode.

13. The combination of a source of current, a vapor electric device connected thereto having a plurality of anodes and a cathode, a plurality of direct-current circuits connected to said cathode and receiving energy from said shunt, translating devices in one of said circuits, and a reactance in another of said circuits to maintain said rectifier active.

14. The combination of a vapor rectifier, a source of energy therefor, a consumption circuit connected to said rectifier and traversed by unidirectional current, and reactances connected in shunt with said rectifier to maintain a current flow therethrough.

15. The combination of a vapor electric device having a cathode and a plurality of anodes, means for supplying current to said anodes, a plurality of auxiliary anodes, means for maintaining arcs between said auxiliary anodes and said cathode, said means including reactance devices in shunt with said arcs.

16. The combination with a mercury vapor rectifier, an alternating supply, and a direct current work circuit therefor, of energy storing devices and means for charging said energy storing devices in shunt to the rectifier together with means for causing the discharge of said energy storing devices through a short circuit including said rectifier.

17. The combination with a mercury vapor rectifier, an alternating supply, and a direct current work circuit therefor, of reactance and means for charging said reactance in shunt to the rectifier together with means for causing the discharge of said reactance through a short circuit including said rectifier.

18. The combination with a mercury vapor rectifier, an alternating supply, and a direct current work circuit therefor, of a plurality of reactances and means whereby said reactances are charged from substantially the full supply voltage and discharged substantially through a short circuit including said rectifier.

19. The combination with a mercury vapor rectifier, an alternating supply, said rectifier being connected by two anodes to the terminals of the supply, and a direct current receiving circuit, of inductances supplied with current across said supply and a connection including said work circuit between the common lead of said inductances and an intermediate point of said source, the cathode of said rectifier being connected to said common lead.

20. The combination with a mercury vapor rectifier, an alternating supply, and a direct current work circuit therefor, of means for maintaining continuity of operation by utilizing energy stored from certain portions of the supply winding at times when such supply portions are not for the moment passing current directly to the work circuit.

21. The combination with a mercury vapor rectifier, an alternating supply, and a direct current work circuit therefor, of means for passing current through said work circuit, means for deriving from said source additional current, inductances traversed by said additional current and circuits for permitting the discharge of said inductances with a path other than the work circuit.

22. An exciting circuit for a vapor rectifier fed from an alternating current source, and supplying direct current to a suitable work circuit, comprising means for deriving a plurality of impulses from said source through said rectifier independently of said work circuit, means for storing energy from such impulses and circuits whereby such energy may be discharged through the rectifier during gaps between said first named impulses and current flow is continuously maintained in the rectifier independent of the current flowing to the work circuit.

Signed at New York, in the county of New York, and State of New York, this 16th day of December, A. D. 1903.

PERCY H. THOMAS.

Witnesses:
Wm. H. Capel,
George H. Stockbridge.